Sept. 7, 1943.   C. E. SMITH ET AL   2,329,090
TIMING SYSTEM
Filed Dec. 26, 1941
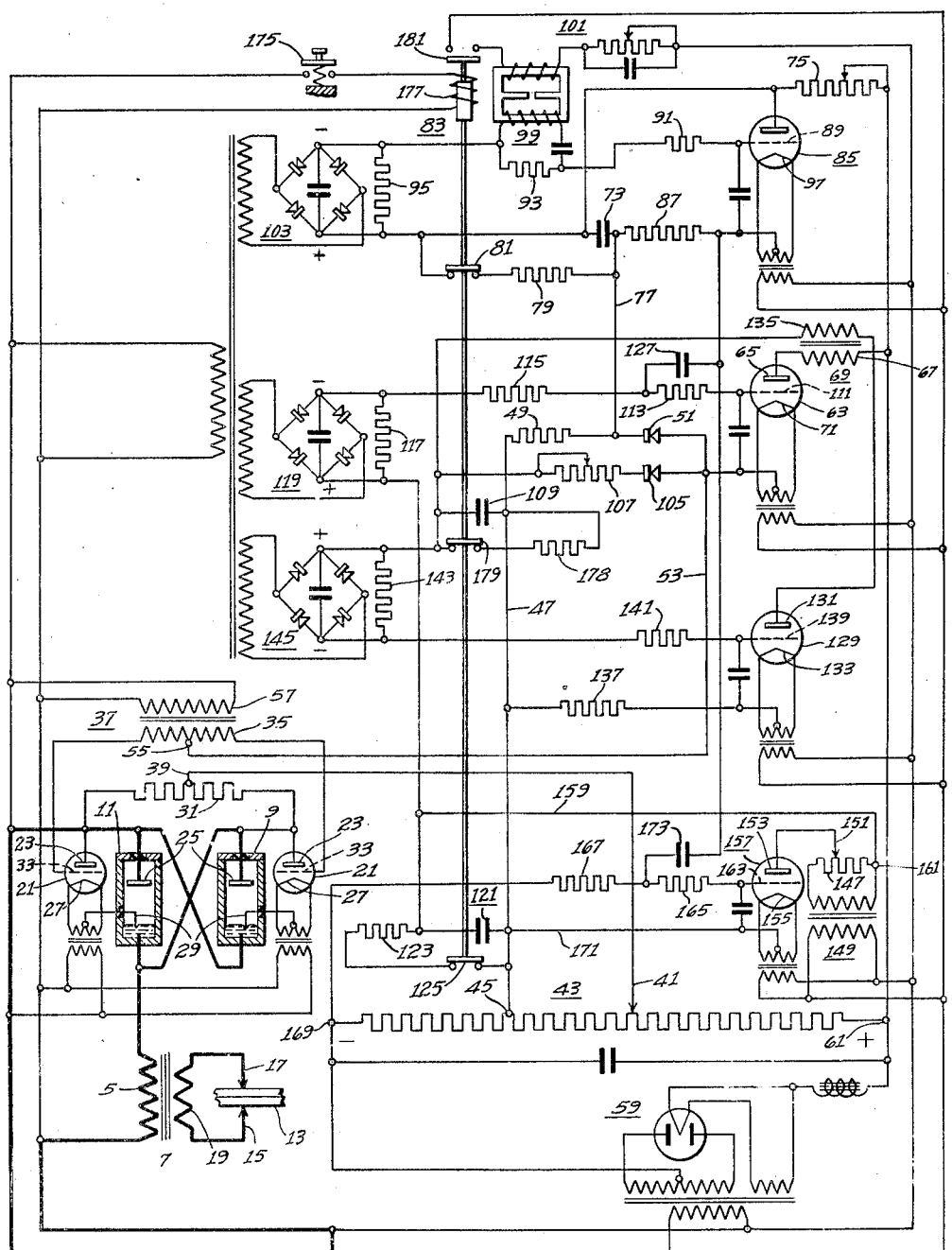
WITNESSES:
C. J. Weller.
John R. Shipman
INVENTORS
Clyde E. Smith and
Slavo J. Murcek.
BY
Hymen Diamond.
ATTORNEY Patented Sept. 7, 1943

2,329,090

UNITED STATES PATENT OFFICE 2,329,090

TIMING SYSTEM

Clyde E. Smith, Wilkinsburg, and Slavo J. Murcek, Duquesne, Pa., assignors to Westinghouse Electric & Manufacturing Company, East Pittsburgh, Pa., a corporation of Pennsylvania Application December 26, 1941, Serial No. 424,482

21 Claims. (Cl. 250—27)

This invention relates to electric discharge apparatus, and has particular relation to an electronic timing system for controlling the supply of power from a source to a load.

In resistance welding, a highly uniform weld of good quality may be obtained by a method of joining materials known as pulsation welding, or interrupted spot welding. Current is supplied to the material to be welded in a predetermined number of discrete impulses. Each impulse is of a predetermined length with a preselected time interval between successive impulses. In the usual welding system, power is supplied from an alternating-current source. Each impulse and the time interval between successive impulses is then measured in terms of half-periods of the source.

A typical pulsation welding system is disclosed in the copending application of Finn H. Gulliksen, Serial No. 271,951, filed May 5, 1939, and assigned to the Westinghouse Electric & Manufacturing Company. In this copending application, welding current is supplied in discrete impulses from an alternating-current source through a pair of inversely connected ignitrons. The periods of conductivity of the ignitrons and therefore the lengths of the impulses, are controlled by a timing circuit which employs a number of electric discharge valves and their control circuits. Another similar timing circuit is arranged to control the length of the time interval between successive impulses. After a predetermined number of impulses have been supplied through the ignitrons, a third timing circuit is effective to permanently prevent the ignitrons from conducting current and thus halt the welding operation.

Because of the number of different materials having widely varying properties which are to be welded by a single pulsation welding apparatus, the timing must be adjustable over a wide range. In addition, present-day welding operations require a high degree of accuracy in the timing of the welding current. While developing a satisfactory degree of accuracy in timing and permitting adjustment of the timing over a wide range, apparatus constructed in accordance with the teachings of the prior art requires a large number of electric discharge devices and their associated control circuits. As a result, the prior art welding systems are rather expensive and somewhat complicated. However, the more complicated an apparatus is, the greater the possibility of an error or a failure in operation. An apparatus which is simple in construction and operation not only reduces the likelihood of an error or a failure but also is comparatively inexpensive in both its maintenance and its original cost. It follows that by thus improving the apparatus, the use of pulsation welding in its present applications may be increased and this method of welding extended to new fields.

It is accordingly an object of our invention to provide a pulsation welding system having a simplified construction and operation.

Another object of our invention is to provide a new and improved timing system for pulsation welding.

A more general object of our invention is to provide a novel system for supplying power from a source to a load in discrete impulses, each impulse being of a predetermined length with a preselected time interval between successive impulses.

Another object of our invntion is to provide a novel system for supplying power from a source to a load in discrete units consisting of a desired number of impulses of a predetermined length with a preselected time interval between successive impulses.

An ancillary object of our invention is to provide a novel arrangement for the control of electric discharge valves of the arc like type.

More specifically, it is an object of our invention to provide a simplified timing system for a pulsation welder which is widely adjustable and affords a high degree of accuracy in timing.

In accordance with our invention, welding current is supplied from an alternating-current source through a pair of inversely connected ignitrons under the control of a timing system energized from a direct-current source. An off-time capacitor is connected to be charged at a preselected rate from the direct-current source. A first electric discharge device or initiating valve is disposed in a discharge circuit for the off-time capacitor and is rendered conductive to discharge the capacitor substantially instantaneously when the charge on the capacitor attains a predetermined magnitude. A second electric discharge device or control valve is then rendered conductive in response to the discharge of the off-time capacitor. The initiating valve becomes non-conductive when the off-time capacitor potential decreases below the arc-drop thereof but the control valve is connected in a circuit shunting the off-time capacitor so that it cannot be recharged while the control valve is conductive.

A second or on-time capacitor is arranged to be charged at a pre-chosen rate by the current flowing through the control valve. When the charge on the on-time capacitor attains a predetermined magnitude, the on-time capacitor is discharged through a third electric discharge device or stop valve and the primary of a blocking transformer in series therewith. The secondary of the transformer is then effective to momentarily block the flow of current through the control valve and render it non-conductive. Upon the control valve becoming non-conductive, recharging of the off-time capacitor is commenced and the cycle of operation is repeated. Thus the control valve is conductive for a time interval determined by the charging rate of the on-time capacitor and is non-conductive for an interval determined by the rate of charging of the off-time capacitor. The control valve is also connected in the control circuit of the ignitrons in such a manner that the latter conduct welding current as long as the control valve is conductive.

A third or over-all-time capacitor is connected in the control circuit of the control valve and also in circuit with a source of alternating-current potential and a fourth electric discharge device of the arc-like type. The fourth device is rendered conductive to conduct a half period of current in response to a discharge of the off-time capacitor. Consequently, a single impulse of charging current is supplied to the over-all-time capacitor each time the off-time capacitor is discharged. A rectifier is provided in circuit with the over-all-time capacitor to prevent it from losing its charge. After the off-time capacitor is discharged a predetermined number of times, the charge on the over-all-time capacitor attains such a magnitude as to permanently prevent the control valve from becoming conductive.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawing, the single figure of which is a diagrammatic view showing an embodiment of our invention.

As shown in the drawing, current is supplied from an alternating-current source 3 to the primary 5 of a welding transformer 7 through a pair of inversely connected ignitrons 9 and 11. The material 13 to be welded is engaged by a pair of welding electrodes 15 and 17 which are connected across the secondary 19 of the transformer 7. An electric discharge device 21, preferably a thyratron, which is hereinafter designated as a firing valve, is provided for each ignitron 9 and 11. The anode 23 of each firing valve 21 is connected to the anode 25 of the corresponding ignitron while the cathode 27 of each firing valve is connected to the igniter 29 of the corresponding ignitron. The anodes 23 of the firing valves 21 are connected to opposite ends of a resistor 31 and the grids 33 are connected to opposite ends of the secondary 25 of an auxiliary transformer 37. The control circuit for either of the firing valves 21 may then be traced from its anode 23 through a portion of the resistor 31, the intermediate tap 39 of the resistor 31, to an adjustable tap 41 on a voltage divider 43. From an intermediate tap 45 on the voltage divider 43, the control circuit continues through a conductor 47, a resistor 49, a dry type rectifier 51, another conductor 53, the intermediate tap 55 of the secondary 35 to the grid 33 of the firing valve.

It is to be noted that an alternating potential is impressed across resistor 31 from the source 3. To counteract the effect of this alternating potential in the control circuits of the firing valves, the primary 57 of the auxiliary transformer 37 is connected to the source in a reverse manner from the connection of the resistor 31. Consequently, the only effective potential in the control circuits of the firing valves is that supplied from the voltage divider 43 which is a direct-current potential obtained from the alternating-current source 3 through a rectifying system 59. The positive terminal 61 of the voltage divider 43 is also connected to the grids 33 of the firing valves 21 through an electric discharge device 63 which is preferably a thyratron and is designated as the control valve. The anode 65 of the control valve is connected to the positive terminal 61 through the secondary 67 of a blocking transformer 69 and the cathode 71 is connected to conductor 53. Thus, whenever the control valve 63 is conductive, the grids 33 of the firing valves 21 become positive with respect to their anodes 23 and the firing valves are rendered conductive in alternate half periods of the alternating source. As each firing valve becomes conductive current flows through the igniter of the corresponding ignitron to render the ignitron conductive for a half period.

A first or time-off capacitor 73 is connected in a circuit extending from the positive terminal 61 of the voltage divider 43 through a variable resistor 75, the capacitor 73, conductor 77 and resistor 49 to the intermediate tap 45 of the divider. Prior to operation of this system, the off-time capacitor 73 is maintained in a discharged condition by an auxiliary discharge circuit including a resistor 79 and the closed contacts 81 of a current relay 83.

A second electric discharge device 85 and a resistor 87 are connected in a discharge circuit across the off-time capacitor 73. The second device is also preferably a thyratron and is hereinafter called the initiating valve. The control circuit of the initiating valve may be traced from its grid 89 through a grid resistor 91, a resistor 93, another resistor 95, the off-time capacitor 73 and a resistor 87 to the cathode 97 of the valve. The resistor 95 has a direct-current potential impressed thereacross from a source 103. A pulsating potential is impressed across the resistor 93 through an impulse transformer 99 from alternating source 3. A phase-shifting circuit 101 is arranged to shift the phase of this pulsating potential to correspond with the power factor of the load. Thus, the resultant potential in the control circuit of the initiating valve 85 is made up of the pulsating potential on resistor 93 and the direct-current potentials across resistor 95 and the off-time capacitor 73. While the off-time capacitor 73 is uncharged, the potential across resistor 95 is sufficient to prevent the initiating valve from being rendered conductive by the potential impulses on resistor 93. However, when the charge on the off-time capacitor 73 attains a predetermined magnitude, it counteracts the potential across resistor 95 and the initiating valve is rendered conductive by the next positive impulse across the resistor 93. Consequently, the off-time capacitor is discharged substantially instantaneously through the discharging circuit, the initiating valve becoming non-conductive when the off-time capacitor potential decreases below the arc-drop of the valve.

The circuit through the control valve 63 may be traced from the positive terminal 61 of the divider 43 through the secondary 67 of a blocking transformer 69, the anode 65 and cathode 71 of the control valve 63, and through a parallel circuit comprising a dry rectifier 105, a variable resistor 107 and a second or on-time capacitor 109 on one side; and the dry type rectifier 51 and resistor 49 on the other side, and then through conductor 47 to the intermediate tap 45 of the divider. The control circuit of the control valve may be traced from its grid 111 through a grid resistor 113, a resistor 115, another resistor 117 having a direct-current potential impressed thereon from a source 119, a third or over-all-time capacitor 121, the resistor 49 and rectifier 51 to the cathode 71 of the valve. The on-time capacitor and the over-all-time capacitor are originally uncharged for prior to operation of the apparatus they are maintained in a discharged condition by individual, auxiliary discharge circuits including resistor 178 and contactor 179 of relay 83 and resistor 123 and contactor 125, respectively. Consequently, the biasing potential from the source 119 is sufficient originally to maintain the control valve 63 non-conductive. However, the resistor 87 in the discharge circuit of the off-time capacitor 73 is also connected across the grid 111 and cathode 71 of the control valve 63 through a capacitor 127 and the grid resistor 113 on one side, and the rectifier 51 on the other side. Then, when the off-time capacitor 73 discharges through the resistor 87, a potential is established thereacross which momentarily overcomes the biasing potential of the control valve 63 to render it conductive.

A third discharge device 129 has its anode 131 and cathode 133 connected in circuit with the on-time capacitor 109 and the primary 135 of the blocking transformer 69 and a resistor 137. The third device is also preferably a thyratron and is hereinafter designated as the stop valve. Its control circuit may be traced from its grid 139 through a grid resistor 141, another resistor 143 having a direct-current potential impressed thereon from a source 145, the on-time capacitor 109 and resistor 137 to the cathode 133. The potential across resistor 143 maintains the stop valve non-conductive until the on-time capacitor attains a predetermined magnitude. Conductivity of the stop valve 129 permits the on-time capacitor 109 to be discharged through the primary 135 of the blocking transformer 69. The potential then appearing across the secondary 67 of the transformer 69 momentarily opposes that supplied by the divider 43 through control valve 63 and the latter becomes non-conductive.

An alternating potential is present across a potentiometer 147 which is energized from the alternating-current source 3 through an auxiliary transformer 149. A portion of this alternating potential is impressed in a circuit extending from the adjustable tap 151 of the potentiometer 147 through the anode 153 and cathode 155 of a fourth discharge valve 157, and over-all-time capacitor 121 and conductor 159 to the end terminal 161 of the potentiometer 147. The control circuit of the fourth valve, which is preferably a thyratron, may be traced from the grid 163 thereof through the grid resistor 165, another resistor 167, the negative terminal 169 of the divider 43, the intermediate tap 45 and a conductor 171 to the cathode 155. The fourth valve is thus maintained non-conductive by the biasing potential supplied from the divider. However, a circuit may also be traced from the grid 163 through resistor 165, a capacitor 173, resistor 87, conductor 77, resistor 49 and conductors 47 and 171 to cathode 155. Therefore, the potential established across the resistor 87 when the off-time capacitor 73 discharges is also impressed between the grid 163 and cathode 155 of the fourth valve 157 and is sufficient to render it conductive. As previously pointed out, the off-time capacitor 73 is discharged at an instant in the positive half period of the source 3 as determined by the phase shifting circuit 101. This instant may be any desired and is usually the instant of beginning of a positive half period of current. Since the discharge of the capacitor 73 is substantially instantaneous the fourth valve 157 is also rendered conductive at the selected instant. Current then flows through the fourth valve and the over-all-time capacitor 121 until the end of the positive half period of the source 3. It is evident that because of the rectifier 51 in circuit therewith, the over-all-time capacitor 121 does not lose the charge thus obtained when the fourth valve becomes non-conductive. Each time the off-time capacitor 73 is discharged the over-all-time capacitor 121 receives an increment of charge. After the off-time capacitor 73 is discharged a predetermined number of times, the over-all-time capacitor 121 charge attains a magnitude sufficient to permanently prevent the control valve 63 from becoming conductive. The setting of the adjustable tap 151 may, of course, be altered to vary the number of times the capacitor 73 is discharged before the over-all-time capacitor prevents conductivity of the control valve.

Operation of the welding apparatus may be initiated by closing a push button switch 175. The coil 177 of the current relay 83 is in circuit with the push button switch 175 across the alternating-current source 3 and is thereby energized. Upon energization of the current relay 83, its contactors 81, 125, 179 in the auxiliary discharge circuits across the off-time, on-time, and over-all-time capacitors are opened and its contactor 181 in circuit with the impulse transformer 99 is closed. Charging of the off-time capacitor 73 is then initiated at a rate as predetermined by the setting of the variable resistor 75. After the charge on the off-time first capacitor 73 attains a preselected magnitude, the initiating valve 85 becomes conductive and the capacitor 73 is substantially instantaneously discharged. The control valve 63 is rendered conductive in response to the discharge of the off-time capacitor 73. While the control valve 63 is conductive, the grids 33 of the firing valves 21 are positive and the ignitrons 9 and 11 are rendered conductive alternately to supply current to the welding transformer 7.

The initiating valve 85 becomes non-conductive when the off-time capacitor 73 is discharged below the arc drop of the valve. However the control valve 63 is in a shunting circuit for the off-time capacitor 73. Thus, as long as the control valve 63 continues to conduct current, the off-time capacitor 73 cannot be recharged. However, the on-time capacitor 109 is charged by the current flowing through the control valve 63 at a rate determined by the setting of the variable resistor 107. When this on-time capacitor 109 obtains a predetermined charge, it is discharged through the stop valve 129 and the primary 135 of blocking transformer 69. The discharging current flowing through the primary 135 establishes a potential across the secondary 67 which momentarily blocks current flow through the control valve 63 and renders it non-conductive. While the control valve 63 is non-conductive, the grids 33 of the firing valves 21 are negative so that the firing valves cannot render the ignitrons, 9 and 11, conductive.

The fourth discharge valve 157 is also rendered conductive in response to the discharge of the off-time capacitor 73 to supply a current impulse to the over-all-time capacitor 121 of a magnitude determined by the setting of potentiometer 147. It is apparent that when the control valve 63 is rendered non-conductive by the blocking transformer 69, the shunting circuit around the off-time capacitor 73 is opened and recharging of the capacitor 73 is commenced. After the off-time capacitor 73 is recharged to the preselected potential, the initiating valve 65 is again rendered conductive to discharge the capacitor 73 and the cycle of operation is repeated. Each time the off-time capacitor 73 is discharged, a current impulse is supplied to the over-all-time capacitor 121. After the off-time capacitor 73 is discharged a predetermined number of times, the potential across the over-all-time capacitor 121 attains a magnitude sufficient to prevent the control valve 63 from becoming conductive again and the welding operation is halted. Another welding operation may be accomplished by releasing the push button switch and then reclosing it.

Although we have shown and described certain specific embodiments of our invention, we are fully aware that many modifications thereof are possible. Our invention, therefore, is not to be restricted except insofar as is necessitated by the prior art and the spirit of the appended claims.

We claim as our invention:

1. In a timing system, the combination comprising a source of direct-current potential, a capacitor connected to be charged at a preselected rate from said source, means responsive to a charge of a predetermined magnitude on said capacitor for effecting discharge thereof, an electric valve connected across said source in a circuit shunting said capacitor, means responsive to the discharge of said capacitor for rendering said valve conductive thereby preventing said capacitor from being recharged, timing means, the operation of which is initiated when said valve becomes conductive, for rendering said valve non-conductive after a predetermined time interval independently of said capacitor charging connection, whereby said capacitor is recharged at said preselected rate, and work means responsive to the conductivity of said valve.

2. In a timing system, the combination comprising a source of direct-current potential, a capacitor connected to be charged at a preselected rate from said source, means responsive to a charge of a predetermined magnitude on said capacitor for effecting discharge thereof, an electric discharge valve connected across said source in a circuit shunting said capacitor, means responsive to the discharge of said capacitor for rendering said valve conductive, thereby preventing said capacitor from being recharged, timing means responsive to current flow through said valve for rendering it non-conductive a predetermined time after it becomes conductive to permit said capacitor to be recharged at said preselected rate, and work means responsive to the conductivity of said valve.

3. In a timing system, the combination comprising a source of direct-current potential, a capacitor connected to be charged at a preselected rate from said source, a discharge circuit for said capacitor, a first electric discharge valve in said discharge circuit, control means responsive to a predetermined charge on said capacitor for rendering said first valve conductive to discharge said capacitor, said first valve becoming non-conductive when said capacitor is discharged, a second electric discharge valve connected across said source in a circuit shunting said capacitor, means responsive to the discharge of said capacitor for rendering said second valve conductive, thereby preventing said capacitor from being recharged, timing means responsive to current flow through said second valve for rendering it non-conductive a predetermined time interval after it becomes conductive to permit said capacitor to be recharged at said preselected rate, and work means responsive to the conductivity of said second valve.

4. In a timing system, the combination comprising a source of direct-current potential, a capacitor connected to be charged at a preselected rate from said source, means responsive to a charge of a predetermined magnitude on said capacitor for effecting discharge thereof, an electric discharge valve connected across said source in a circut shunting said capacitor, means responsive to the discharge of said capacitor for rendering said valve conductive thereby preventing said capacitor from being recharged, a second capacitor, means for connecting said second capacitor to be charged at a predetermined rate by the current flowing through said valve, means responsive to a prechosen charge on said second capacitor for rendering said valve non-conductive to permit recharging of said first capacitor, and work means responsive to the conductivity of said valve.

5. In a timing system, the combination comprising a source of direct-current potential, a capacitor connected to be charged at a preselected rate from said source, means responsive to a charge of a predetermined magnitude on said capacitor for effecting discharge thereof, an electric discharge valve connected across said source in a circuit shunting said capacitor, means responsive to the discharge of said capacitor for rendering said valve conductive thereby preventing said capacitor from being recharged, timing means for rendering said valve non-conductive a predetermined time interval after it becomes conductive to permit said capacitor to be recharged, means including additional means responsive to each discharge of said capacitor, for permanently preventing said valve from being rendered conductive after said capacitor is discharged a preselected number of times, and work means responsive to the conductivity of said valve.

6. In a timing system, the combination comprising a source of direct-current potential, a capacitor connected to be charged at a preselected rate from said source, means responsive to a charge of a predetermined magnitude on said capacitor for effecting discharge thereof, an electric discharge valve connected across said source in a circuit shunting said capacitor, means responsive to the discharge of said capacitor for rendering said valve conductive thereby preventing said capacitor from being recharged, a second capacitor, means for connecting said second capacitor to be charged at a predetermined rate by the current flowing through said valve, means responsive to a prechosen charge on said second capacitor for rendering said valve non-conductive to permit recharging of said first capacitor, means, including additional means responsive to each discharge of said first capacitor, for permanently preventing said valve from being rendered conductive, and work means responsive to the conductivity of said valve.

7. In a timing system, the combination comprising a source of direct-current potential, a first capacitor connected to be charged at a preselected rate from said source, a discharge circuit for said capacitor, a first electric discharge valve in said discharge circuit, control means responsive to a predetermined charge on said capacitor for rendering said first valve conductive to discharge said capacitor, said first valve becoming non-conductive when said capacitor is discharged, a second electric discharge valve connected across said source in a circuit shunting said capacitor, means responsive to the discharge of said capacitor for rendering said second valve conductive thereby preventing said first capacitor from being recharged, a second capacitor, means for connecting said second capacitor to be charged at a predetermined rate by the current flowing through said second valve, means responsive to a predetermined charge on said second capacitor for rendering said second valve non-conductive to permit recharging of said first capacitor, and work means responsive to the conductivity of said second valve.

8. In a timing system, the combination comprising a source of direct-current potential, a capacitor connected to be charged at a preselected rate from said source, a discharge circuit for said capacitor, a first electric discharge valve in said discharge circuit, control means responsive to a predetermined charge on said capacitor for rendering said first valve conductive to discharge said capacitor, said first valve becoming non-conductive when said capacitor is discharged, a second electric discharge valve connected across said source in a circuit shunting said capacitor, means resposive to the discharge of said capacitor for rendering said second valve conductive thereby preventing said capacitor from being recharged, timing means for rendering said second valve non-conductive a predetermined time interval after it becomes conductive to permit said capacitor to be recharged at said preselected rate, means, including additional means responsive to each discharge of said capacitor, for permanently preventing said second valve from being rendered conductive after said first capacitor is discharged a preselected number of times, and work means responsive to the conductivity of said second valve.

9. In a timing system, the combination comprising a source of direct-current potential, a capacitor connected to be charged at a preselected rate from said source, means responsive to a charge of a predetermined magnitude on said capacitor for effecting discharge thereof, a first electric discharge valve connected across said source in a circuit shunting said capacitor, means responsive to the discharge of said capacitor for rendering said first valve conductive thereby preventing said capacitor from being recharged, a second capacitor, means for connecting said second capacitor to be charged at a predetermined rate by the current flowing through said first valve, a second electric discharge valve connected in a discharge circuit across said second capacitor, control means responsive to a prechosen charge on said second capacitor for rendering said second valve conductive to discharge said second capacitor, means responsive to the current flowing through said second valve for rendering said first valve non-conductive to permit recharging of said first capacitor, and work means responsive to the conductivity of said first valve.

10. In a timing system, the combination comprising a source of direct-current potential, a capacitor connected to be charged at a preselected rate from said source, a discharge circuit for said capacitor, a first electric discharge valve in said discharge circuit, control means responsive to a predetermined charge on said capacitor for rendering said first valve conductive to discharge said capacitor, said first valve becoming non-conductive when said capacitor is discharged, a second electric discharge valve connected across said source in a circuit shunting said capacitor, means responsive to the discharge of said capacitor for rendering said second valve conductive thereby preventing said capacitor from being recharged, a second capacitor, means for connecting said second capacitor to be charged at a predetermined rate by the current flowing through said second valve, a third electric discharge valve connected in a discharge circuit across said second capacitor, control means responsive to a prechosen charge on said second capacitor for rendering said third valve conductive to discharge said second capacitor, means responsive to the current flowing through said third valve for rendering said second valve non-conductive to permit recharging of said first capacitor, and work means responsive to the conductivity of said second valve.

11. In a timing system, the combination comprising a source of direct-current potential, a capacitor connected to be charged at a preselected rate from said source, means responsive to a charge of a predetermined magnitude on said capacitor for effecting discharge thereof, an electric discharge valve of the arc-like type connected across said source in a circuit shunting said capacitor, means responsive to the discharge of said capacitor for rendering said valve conductive thereby preventing said capacitor from being recharged, a second capacitor, means for connecting said second capacitor to be charged at a predetermined rate by the current flowing through said valve, a second electric discharge valve connected in a discharge circuit across said second capacitor, control means responsive to a prechosen charge on said second capacitor for rendering said second valve temporarily conductive to discharge said capacitor, means including a transformer having a primary in circuit with said second valve and a secondary in circuit with said first valve, for rendering said first valve non-conductive when said second valve becomes conductive, and work means responsive to the conductively of said first valve.

12. In a timing system, the combination comprising a source of direct-current potential, a capacitor connected to be charged at a preselected rate from said source, means responsive to a charge of a predetermined magnitude on said capacitor for effecting discharge thereof, an electric discharge valve connected across said source in a circuit shunting said capacitor, a control circuit for said valve including means responsive to the discharge of said capacitor for rendering said valve conductive, thereby preventing said capacitor from being recharged, timing means for rendering said valve non-conductive a predetermined time interval after it becomes conductive to permit said capacitor to be recharged at said preselected rate, said control circuit including a second capacitor, means responsive to each discharge of said first capacitor for supplying a charging current impulse to said second capacitor, said second capacitor being effective after receipt of a predetermined number of impulses to permanently prevent said valve from being rendered conductive, and work means responsive to the conductivity of said valve.

13. Apparatus according to claim 12 in which said impulse supplying means comprises a source of alternating current and an electric discharge device of the arc-like type in circuit with said second capacitor, and control means responsive to each discharge of said first capacitor for rendering said device conductive for a half period of said alternating-current source.

14. In combination, a source of direct current, main valve means in circuit with said source and having a control circuit, control means in said control circuit repeatedly operable to render said main valve means conductive and then non-conductive, a capacitor in said control circuit, a source of alternating current, means including auxiliary valve means, for connecting said alternating-current source in circuit with said capacitor, and means for rendering said auxiliary valve means conductive during a preselected portion of a positive half period of said alternating-current source in response to each operation of said control means to supply a current impulse to said capacitor, said second capacitor being effective after receipt of a predetermined number of said impulses to prevent said control means from rendering said main valve means conductive.

15. In combination, a source of direct current, valve means in circuit with said source and having a control circuit, control means in said control circuit repeatedly operable to render said valve means conductive and then non-conductive, a capacitor in said control circuit, a source of alternating current, means including an electric discharge device of the arc-like type, for connecting said alternating-current source in circuit with said capacitor, means for rendering said device conductive at a preselected instant in a positive half period of said alternating-current source to supply an impulse of charging current to said capacitor in response to each operation of said control means, said capacitor being effective when it attains a charge of a predetermined magnitude to prevent said control means from rendering said valve means conductive, and means for adjusting the magnitude of the charging current impulses.

16. For use in supplying power from a source to a load, the combination comprising main valve means interposed between said power source and said load, a source of direct-current potential, a capacitor connected to be charged at a preselected rate from said potential source, means responsive to a charge of a predetermined magnitude on said capacitor for effecting discharge thereof, an electric discharge device connected across said potential source in a circuit shunting said capacitor, means responsive to the discharge of said capacitor for rendering said device conductive thereby preventing said capacitor from being recharged, timing means for rendering said device non-conductive a predetermined time interval after it becomes conductive to permit said capacitor to be recharged at said preselected rate, and means responsive to the conductivity of said device for controlling the conductivity of said valve means.

17. For use in supplying power from a source to a load, the combination comprising main valve means interposed between said power source and said load, a source of direct-current potential, a capacitor connected to be charged at a preselected rate from said potential source, means responsive to a charge of a predetermined magnitude on said capacitor for effecting discharge thereof, an electric discharge device connected across said potential source in a circuit shunting said capacitor, means responsive to the discharge of said capacitor for rendering said device conductive thereby preventing said capacitor from being recharged, means responsive to the conductivity of said device for controlling the conductivity of said valve means, timing means for rendering said device non-conductive a predetermined time interval after it becomes conductive to permit said capacitor to be recharged at said preselected rate, and means, including additional means responsive to each discharge of said capacitor, for permanently preventing said device from being rendered conductive after said capacitor is discharged a predetermined number of times.

18. For use in supplying power from a source to a load, the combination comprising main valve means interposed between said power source and said load, a source of direct-current potential, a capacitor connected to be charged at a preselected rate from said potential source, means responsive to a charge of a predetermined magnitude on said capacitor for effecting discharge thereof, an electric discharge device connected across said potential source in a circuit shunting said capacitor, means responsive to the discharge of said capacitor for rendering said device conductive thereby preventing said capacitor from being recharged, a second capacitor, means for connecting said second capacitor to be charged at a predetermined rate by the current flowing through said valve, means responsive to a prechosen charge on said second capacitor for rendering said device non-conductive to permit recharging of said first capacitor, and means, including additional means responsive to each discharge of said first capacitor, for permanently preventing said device from being rendered conductive after said capacitor is discharged a predetermined number of times.

19. In a timing system, the combination comprising a source of direct current potential, a capacitor connected to be charged at a preselected rate, means responsive to a charge of a predetermined magnitude on said capacitor for effecting discharge thereof, an electric valve in circuit with said source and arranged to prevent charging of said capacitor when said valve is conductive, means responsive to the discharge of said capacitor for rendering said valve conductive, timing means, the operation of which is initiated when said valve becomes conductive, for rendering said valve non-conductive after a predetermined time interval independently of said capacitor charging connection, whereby said capacitor is recharged at said preselected rate, and work means responsive to the conductivity of said valve.

20. In a timing system, the combination comprising a source of direct current potential, a capacitor connected to be charged at a preselected rate, means responsive to a charge of a predetermined magnitude on said capacitor for effecting discharge thereof, an electric discharge valve of the arc-like type in circuit with said source and arranged to prevent charging of said capacitor when said valve is conductive, means responsive to the discharge of said capacitor for rendering said valve conductive, timing means, the operation of which is initiated when said valve becomes conductive, for impressing a potential impulse in circuit with said valve and source after a predetermined time interval, said impulse being of such polarity and magnitude as to render said valve non-conductive whereby recharging of said capacitor at said preselected rate is initiated, and work means responsive to the conductivity of said valve.

21. In a timing system, the combination comprising a source of direct current potential, a capacitor connected to be charged at a preselected rate, means responsive to a charge of a predetermined magnitude on said capacitor for effecting discharge thereof, an electric discharge valve of the arc like type connected across said source in a circuit shunting said capacitor, means responsive to the discharge of said capacitor for rendering said valve conductive thereby preventing said capacitor from being recharged, timing means, the operation of which is initiated when said valve becomes conductive, for impressing a potential impulse in circuit with said valve and source after a predetermined time interval, said impulse being of such polarity and magnitude as to render said valve non-conductive whereby recharging of said capacitor at said preselected rate is initiated, and work means responsive to the conductivity of said valve.

CLYDE E. SMITH.
SLAVO J. MURCEK.